United States Patent
Noda

[11] Patent Number: 5,889,931
[45] Date of Patent: Mar. 30, 1999

[54] IMAGE OUTPUT METHOD AND APPARATUS THEREOF

[75] Inventor: Hideo Noda, Tokyo, Japan

[73] Assignee: Mutoh Industries Ltd., Tokyo, Japan

[21] Appl. No.: 756,491

[22] Filed: Nov. 26, 1996

[30] Foreign Application Priority Data

Nov. 27, 1995 [JP] Japan .................................. 7-331113

[51] Int. Cl.⁶ ................................................ G06K 15/00
[52] U.S. Cl. .......................................... 395/116; 395/117
[58] Field of Search .................................. 395/101, 114, 395/113, 115, 116, 117; 345/509, 515; 358/404, 444

[56] References Cited

U.S. PATENT DOCUMENTS 5,608,848  3/1997  Walker ...................................... 395/116

FOREIGN PATENT DOCUMENTS 62-105667  5/1987  Japan .
62-105668  5/1987  Japan .
63-226747  9/1988  Japan .

*Primary Examiner*—Arthur G. Evans
*Attorney, Agent, or Firm*—Rabin & Champagne, P.C.

[57] ABSTRACT

An image output method for dividing an image output region of one page into a plurality of bands, developing image data to be output in the format of raster data for each band, and outputting the developed image information for each band is disclosed. Each band is further divided into a plurality of blocks. The bit map memory is divided into a plurality of memory blocks, each of which has a storage capacity of each block. Image data of blocks that contain image data to be developed for each band is successively developed to unused memory blocks. For blank blocks, the developing process to the bit map memory is not performed. Thus, unused memory blocks are used in the developing process for the next block.

6 Claims, 13 Drawing Sheets

IMAGE OUTPUT METHOD AND APPARATUS THEREOF

BACKGROUND OF THE INVENTION (a) Field of the Invention

The present invention relates to an image output method for use with a raster plotter for developing vector data to be output to raster data and an apparatus thereof, in particular, an image output method suitable for effectively developing raster data to a bit map memory and an apparatus thereof.

(b) Prior Art

Image output apparatuses such as raster plotters are mainly categorized as a full-bit-map type and a banding type. In the full-bit-map type apparatus, when input vector data is developed to raster data and then an image is output, raster data as analyzed results is developed to an image memory with a storage capacity equivalent to data of one sheet. On the other hand, in the banding type apparatus, raster data is developed to an image memory with a storage capacity equivalent to band data of which data of one sheet is divided into several bands.

In the banding type apparatus, as the image memory, a banding memory with a storage capacity of for example two bands is used. While raster data of one band developed to one banding memory through intermediate code is being printed, raster data is developed to the other banding memory through intermediate code. For example, when raster data is printed on an A1 size sheet with a resolution of 400 DPI, the full-bit-map type apparatus requires an image memory with a storage capacity of as high as 16 MB. On the other hand, the banding type apparatus requires a memory with a storage capacity of as low as 300 KB (assuming that the band width is 128 dots, the storage capacity necessary for one banding memory is 150 KB and thereby the total storage capacity required is 300 KB).

However, in the conventional banding type image output apparatus, since the raster data is developed for each band, even if a band contains many blank portions, it is assigned one band memory of one band. Thus, most memory portions are wasted for blank information. Thus, the use efficiency of the memory is low. In addition, it takes a long time to clear the contents of the memory. Moreover, in the conventional apparatus, since data of only one band is developed beforehand, the amount of intermediate code of the next band may be large. Alternatively, when the data amount of raster data to be developed is large, even if raster data of one band has been printed, raster data of the other band has not been developed. Thus, the image output apparatus should wait until the raster data of the other band is completely developed. Thus, the print speed adversely decreases.

SUMMARY OF THE INVENTION

The prevent invention is made from the above-described point of view. An object of the present invention is to provide an image output method for allowing the storage region of an image memory to be effectively used and thereby wait time to be reduced.

The present invention is an image output method, comprising the steps of dividing image data of one page into a plurality of data blocks, an image output region of one page being divided into a plurality of bands, each of which is divided into a plurality of blocks, each block data corresponding to each block, preparing bit map memory for writing and reading image data of data blocks that contain valid image data of the data blocks, the bit map memory being divided into a plurality of memory blocks, each of which has a storage capacity for storing image data of data blocks so as to write and read image data for each data block, successively developing image data of data blocks that contain valid image data to unused memory blocks, the memory blocks being linked with position information of blocks to which the image data developed to the memory blocks is output, and successively reading and outputting image data from the memory blocks corresponding to the position information of the blocks.

The present invention is an image output apparatus, comprising image data dividing means for dividing an image output region of one page into a plurality of blocks and dividing image data to be output into image data of each block, a bit map memory for storing the image data of each block, the bit map memory being divided into a plurality of memory blocks, each of which has a storage capacity for storing image data of each block in the format of raster data, an unused memory block identifying means for identifying unused memory blocks from the memory blocks, developing process means for successively developing image data of each of the blocks divided by the image data dividing means as raster data to the unused memory blocks corresponding to identification information of the unused memory block identifying means, memory block assigning means for storing addresses of memory blocks to which the image data has been developed and position information of blocks to which the image data is output, and output means for outputting image data developed to memory blocks with addresses corresponding to the positions of blocks assigned by the memory block assigning means.

Drawing data contains many straight lines that extends in vertical and horizontal directions. A band sometimes contains only vertical lines at both edges. In this situation, if one band memory is used for such a band, since the contents of the memory are almost blank, the use efficiency of the memory adversely decreases. However, according to the image output method of the present invention, each band is further divided into a plurality of blocks. The bit map memory is divided into a plurality of memory blocks, each of which has a storage capacity of each block. Only image data of blocks that contain image data to be developed is successively developed to unused memory blocks. Thus, for blank blocks, the developing process for the memory is not performed. The memory blocks that have not been used for blank blocks can be used in the developing process for the next band. A memory block to which image data has been developed is linked with position information of a block to which the image data is output. Thus, image data is read at output timing of a block corresponding to the position information.

In such a process, blank portions can be removed from the bit map memory. Thus, the use efficiency of the memory is improved. In addition, since the contents of the memory is cleared for each memory block, the time necessary for clearing them can be reduced. Moreover, according to the present invention, for blank blocks of one band, the developing process of image data is not performed. Thus, the blank memory blocks can be used as unused memory blocks in the next developing process. Consequently, with the same memory capacity as that of the conventional apparatus, the prior developing process can be more extended than the conventional apparatus. As a result, the output time of image data can be reduced.

According to the present invention, as long as the relation between a memory block and a block position to which image data developed is clear, the process for each band is not always required. However, in many situations, it is considered that the output process is performed for each band. In this case, the address of a memory block to which image data has been developed and position information of a block to which the image data is output are stored in a memory block assigning means. The memory block assigning means is provided for each band. In addition, since an identifier for identifying a band that is being drawn and another identifier for identifying a band that is currently output are provided, the developing process and the output process can be easily performed in parallel.

These and other objects, features and advantages of the present invention will become more apparent in light of the following detailed description of best mode embodiments thereof, as illustrated in the accompanying drawings.

DETAILED DESCRIPTION OF THE PREFERRED EMBODIMENTS

Figure 1:
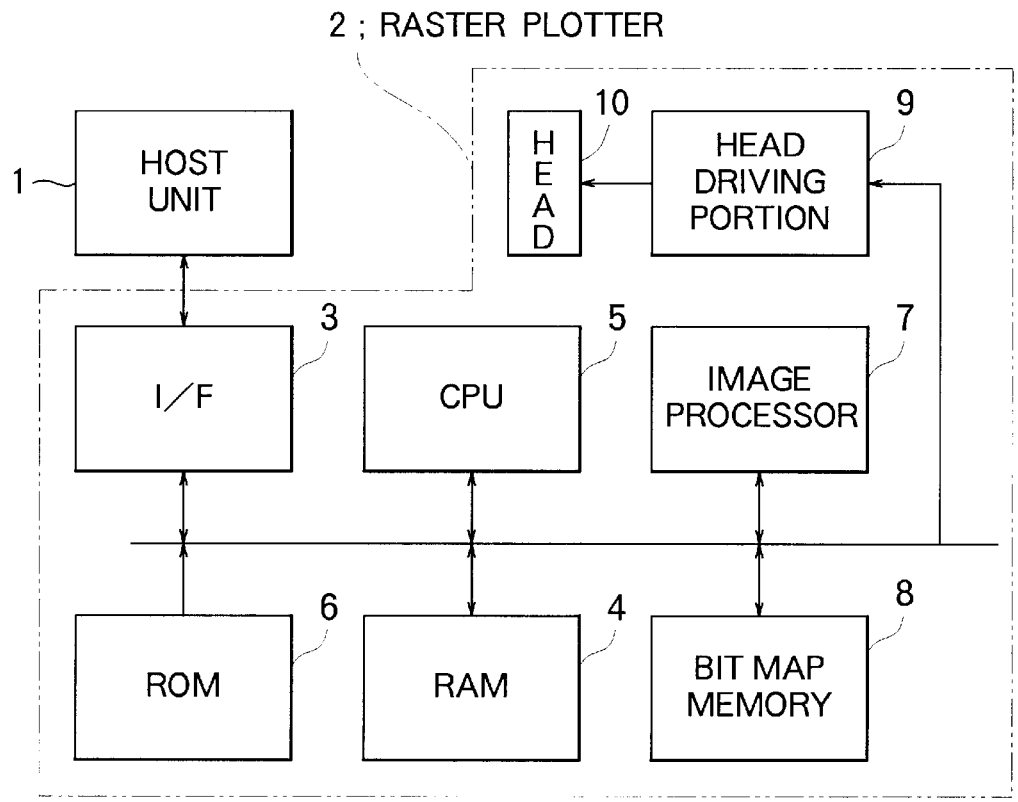
FIG. 1 is a block diagram showing a structure of a system of an image output apparatus according to an embodiment of the present invention.

As shown in FIG. 1, a system corresponding to an image output method corresponding to an embodiment of the present invention is composed of a host unit 1 and a raster plotter 2. The host unit 1 outputs image data of such as a design drawing created with an input unit (not shown) in a format of vector data. The raster plotter 2 converts the vector data received from the host unit 1 into raster data and prints the raster data. The vector data received from the host unit 1 is sent to a RAM 4 through an interface (I/F) 3 that has a FIFO buffering function. A CPU 5 performs pre-processes such as a dividing process and a sorting process so as to divide the vector data stored in the RAM 4 with a predetermined band width and a predetermined block width corresponding to a program stored in the ROM 6. Thereafter, the CPU 5 converts the vector data of each block of each band into intermediate code (for example, vector data). An image processor 7 successively performs DDA process for the image data in the format of intermediate code stored in the RAM 4 and develops the intermediate code to a bit map memory 8. The raster data developed to the bit map memory 8 is successively sent to a head 10 through a head driving unit 9.

Figure 2:
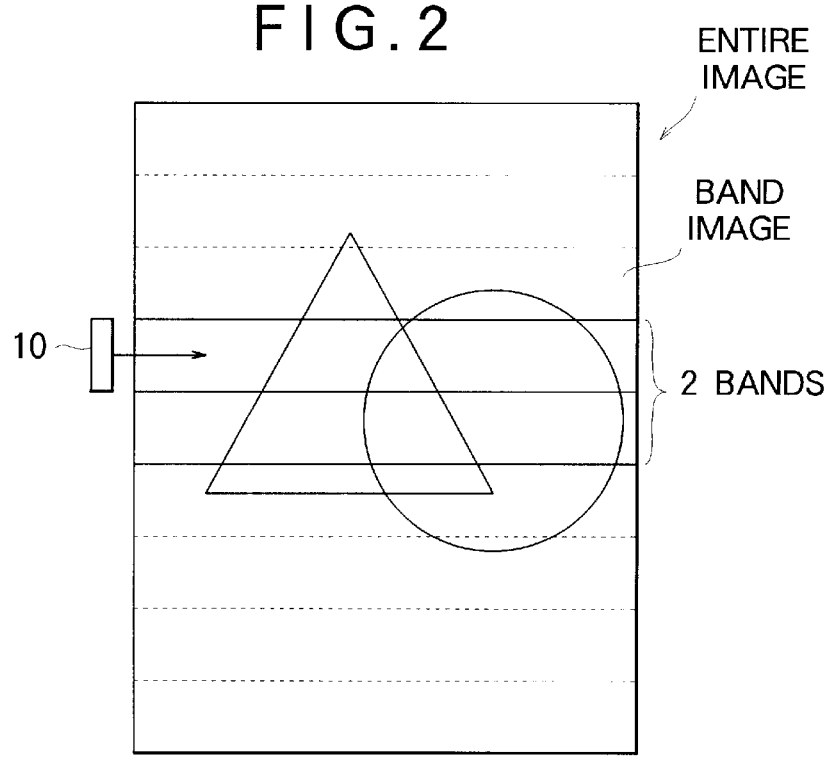
FIG. 2 is a schematic diagram showing the entire image that is output by the apparatus.
Figure 3A:
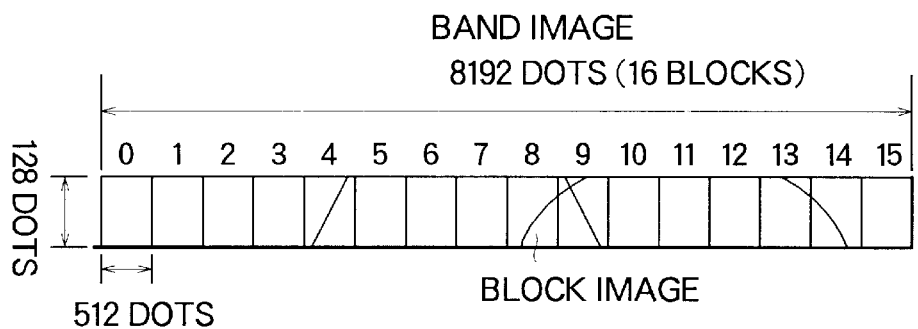
FIGS. 3A and 3B are schematic diagrams showing an example of the storage state of a bit map memory according to the embodiment of the present invention.

FIG. 2 is a schematic diagram showing the entire image that is printed by the raster plotter 2. The entire image is divided into a plurality of band images, each of which has a band width corresponding to the length in the longitudinal direction of the head 10. As shown in FIG. 3A, the band image is further divided into a plurality of block images. Assuming that a drawing is printed by an ink jet type head 10 that has a resolution of 400 DPI and 128 nozzles, when the number of dots in the shorter side of the sheet is 8192, one band can be divided into 16 blocks, each of which is composed of 128×512 dots. Whenever the DDA process is performed, the band image is drawn for each block and developed to the bit map memory 8 that has a storage capacity of two bands (approximately, 270 KB).

Figure 3B:
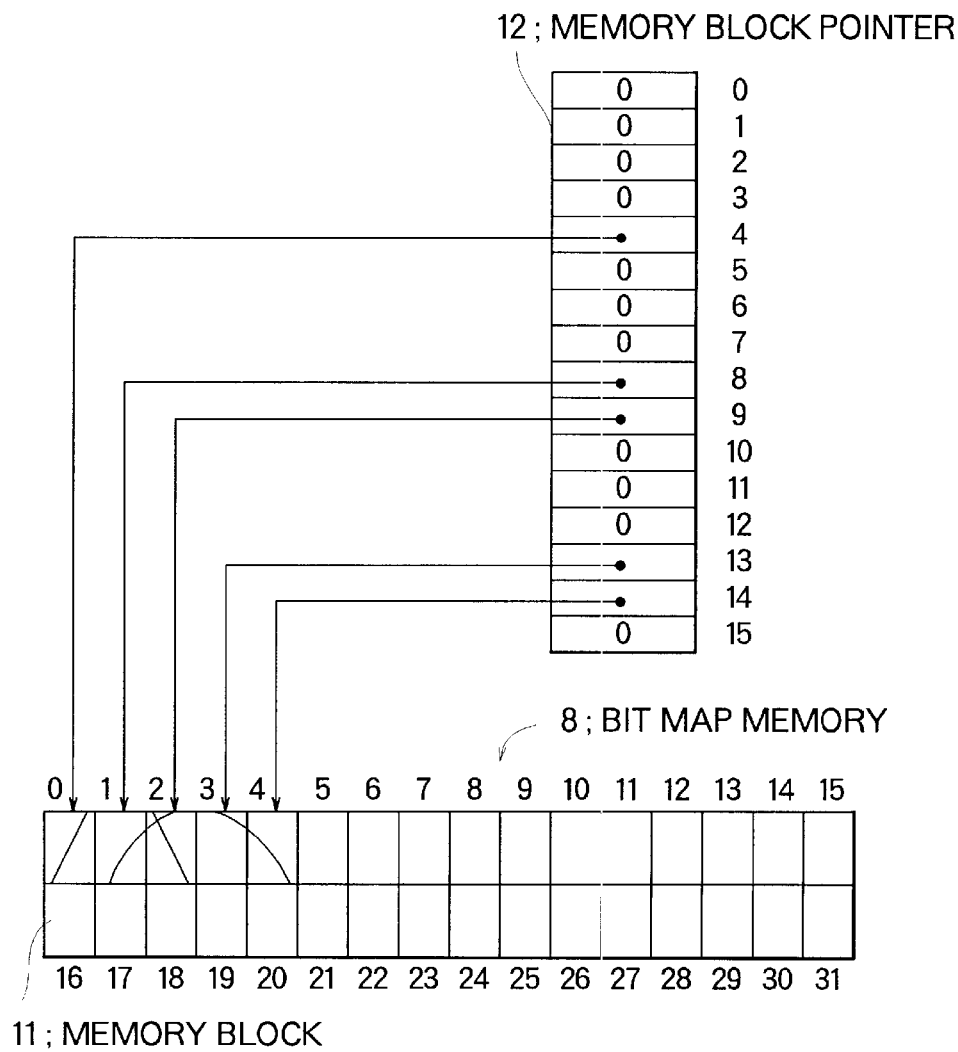

As shown in FIG. 3B, the bit map memory 8 is composed of 32 (=16×2) memory blocks 11 corresponding to the developed block images. The bit map memory 8 or the RAM 4 has pointer 12 (hereinafter, referred to as memory block pointers) as a memory block assigning means that represent whether or not individual blocks contain image data and that represent the addresses of individual memory blocks 11 to which the image data thereof is developed. The memory block pointers 12 designate the positions of blocks that contain valid image data of one band and the addresses of the memory blocks 11 to which the image data of the blocks is developed as raster data. In the example shown in FIG. 3A, 4th, 8th, 9th, 13th, and 14th blocks contain image data to be developed. Thus, as shown in FIG. 3B, pointers to 0th to 4th memory blocks 11 are stored at positions corresponding to 4th, 8th, 9th, 13th, and 14th blocks of the memory block pointers 12. At the other positions of the memory block pointers 12, "0" that represents blank is stored. In this example, even if image data for one band is developed to the bit map memory 8, only five memory blocks are used. The 11 non-use memory blocks can be used in the developing process for the next band along with 16 memory blocks for the next band.

Figure 4:
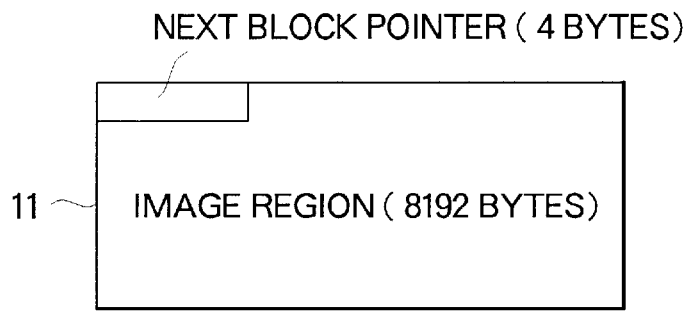
FIG. 4 is a schematic diagram showing a data structure of a memory block according to the embodiment of the present invention.

As shown in FIG. 4, each memory block 11 is composed of an image region and a pointer. In the image region, raster data is developed. The pointer points to an unused memory block that is to be used in the next developing process. This pointer is referred to as next block pointer. The image region is assigned a storage capacity for which image data of one block can be developed (for example, 8192 (=128×512/8) bytes. The next block pointer is assigned a storage capacity of for example four bytes. The next block pointer structures an unused memory block identifying means along with an unused block pointer that will be described later.

Figure 5:
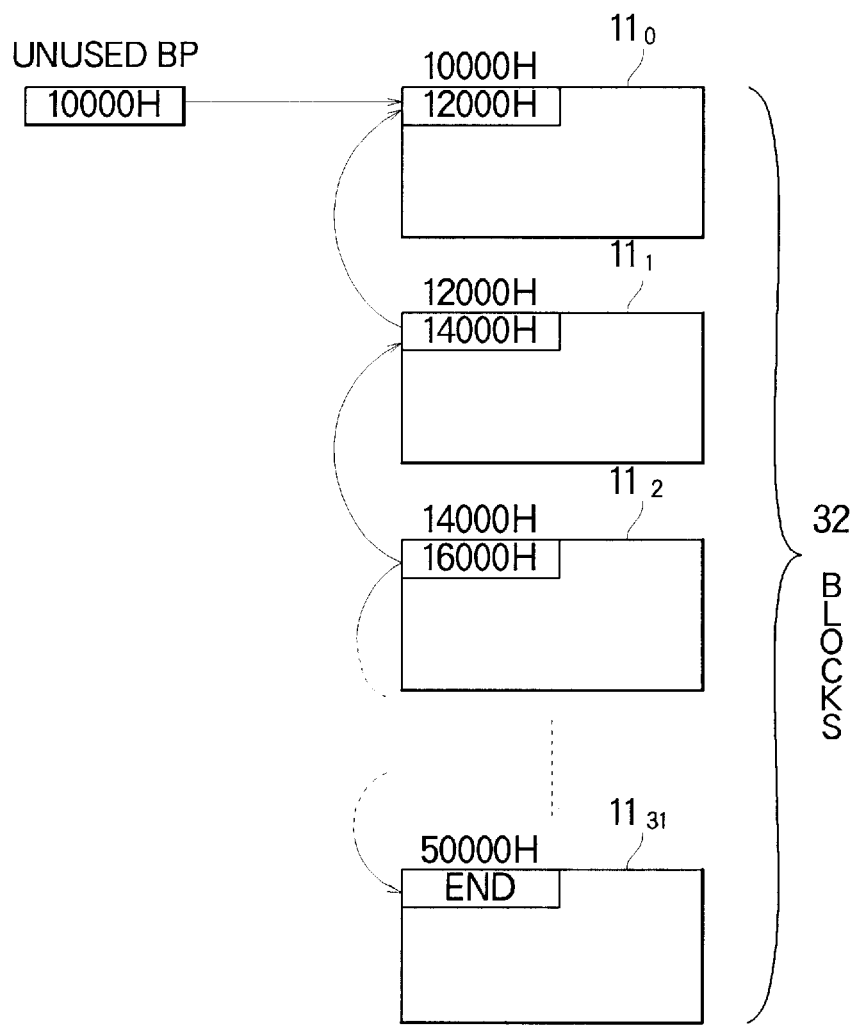
FIG. 5 is a schematic diagram showing a link format of non-use memory blocks in the initial state according to the embodiment of the present invention.

FIG. 5 is a schematic diagram showing a link format of unused memory blocks 11 in the initial state according to the embodiment of the present invention. The bit map memory 8 or the RAM 4 has a pointer that represents the start memory block 11 of the unused memory blocks 11 (hereinafter, this pointer is referred to as unused block pointer). In this example, a start address "10000H" of the unused memory block $11_0$ is stored in the unused block pointer in the initial state. A start address "12000H" of the next unused memory block $11_1$ is stored in the next block pointer of the unused memory block $11_0$. Likewise, a start address of the next unused memory block $11_{i+1}$ is stored in the next block pointer of the unused memory block $11_i$. Thus, 32 unused memory blocks $11_0$ to $11_{31}$ are linked and addresses of all the available memory blocks 11 become clear.

Next, the operation of the raster plotter 2 in the above-described structure will be described.

Figure 6:
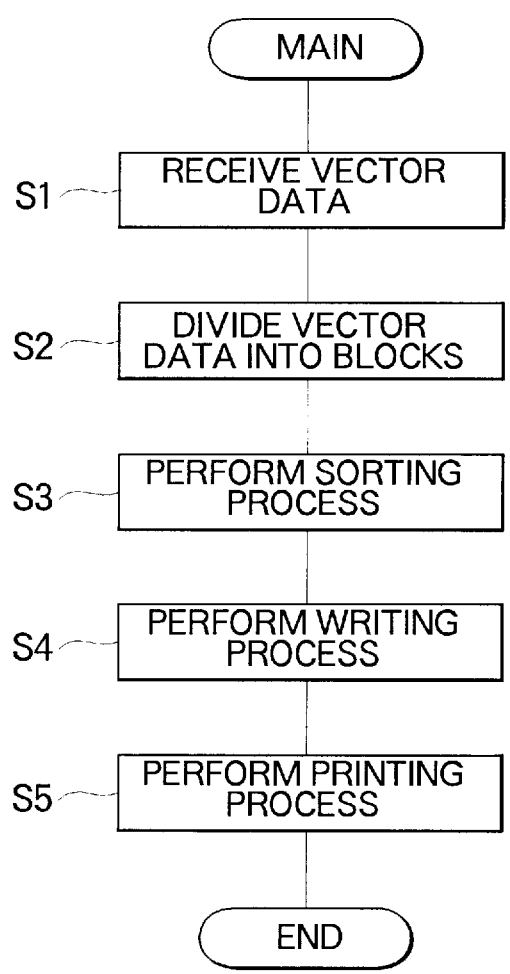
FIG. 6 is a flow chart showing a print output process according to the embodiment of the present invention.

FIG. 6 is a flow chart showing a print out process according to the embodiment of the present invention.

When vector data to be printed is received (at step S1), the vector data is divided into blocks (at step S2). The blocks are converted into intermediate code and then sorted (at step S3). The sorted image data is converted into raster data by the writing process (at step S4). The raster data is output by a printing process (at step S5). The writing process is pre-analyzed so that it is executed simultaneously in parallel with the printing process.

Figure 7:
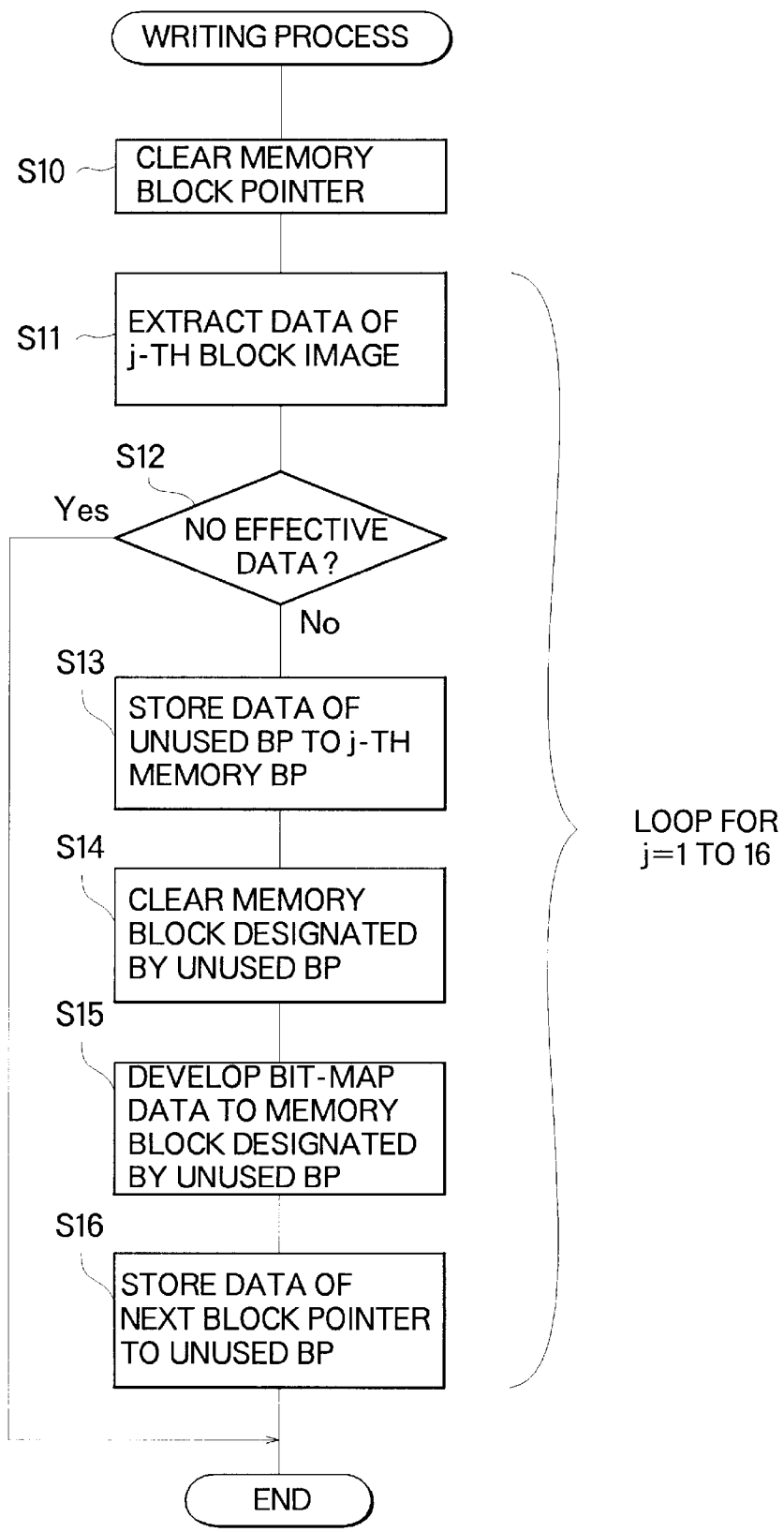
FIG. 7 is a flow chart showing a drawing process according to the embodiment of the present invention.
Figure 8:
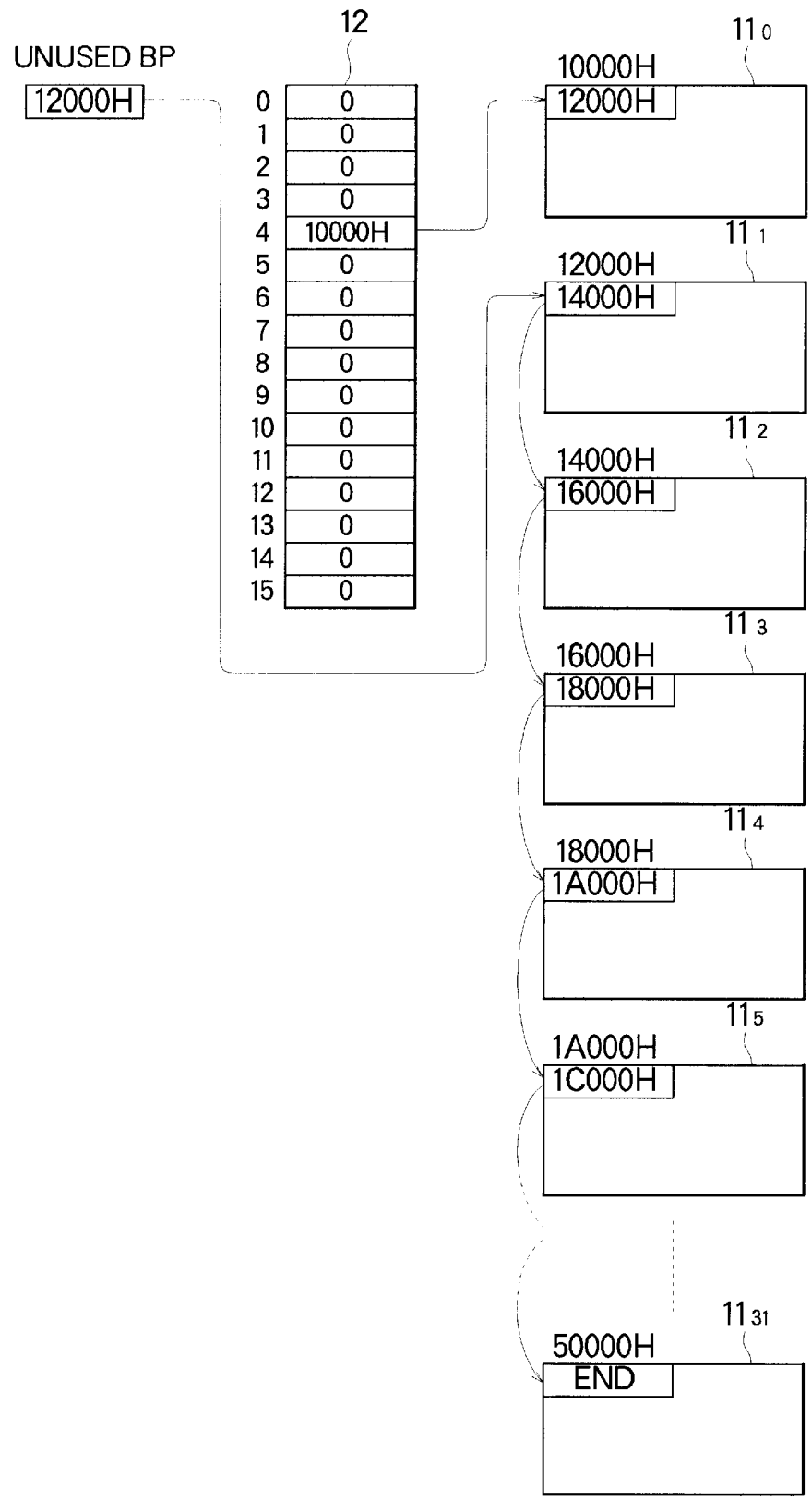
FIG. 8 is a schematic diagram showing a drawing state of the bit map memory according to embodiment of the present invention.
Figure 9:
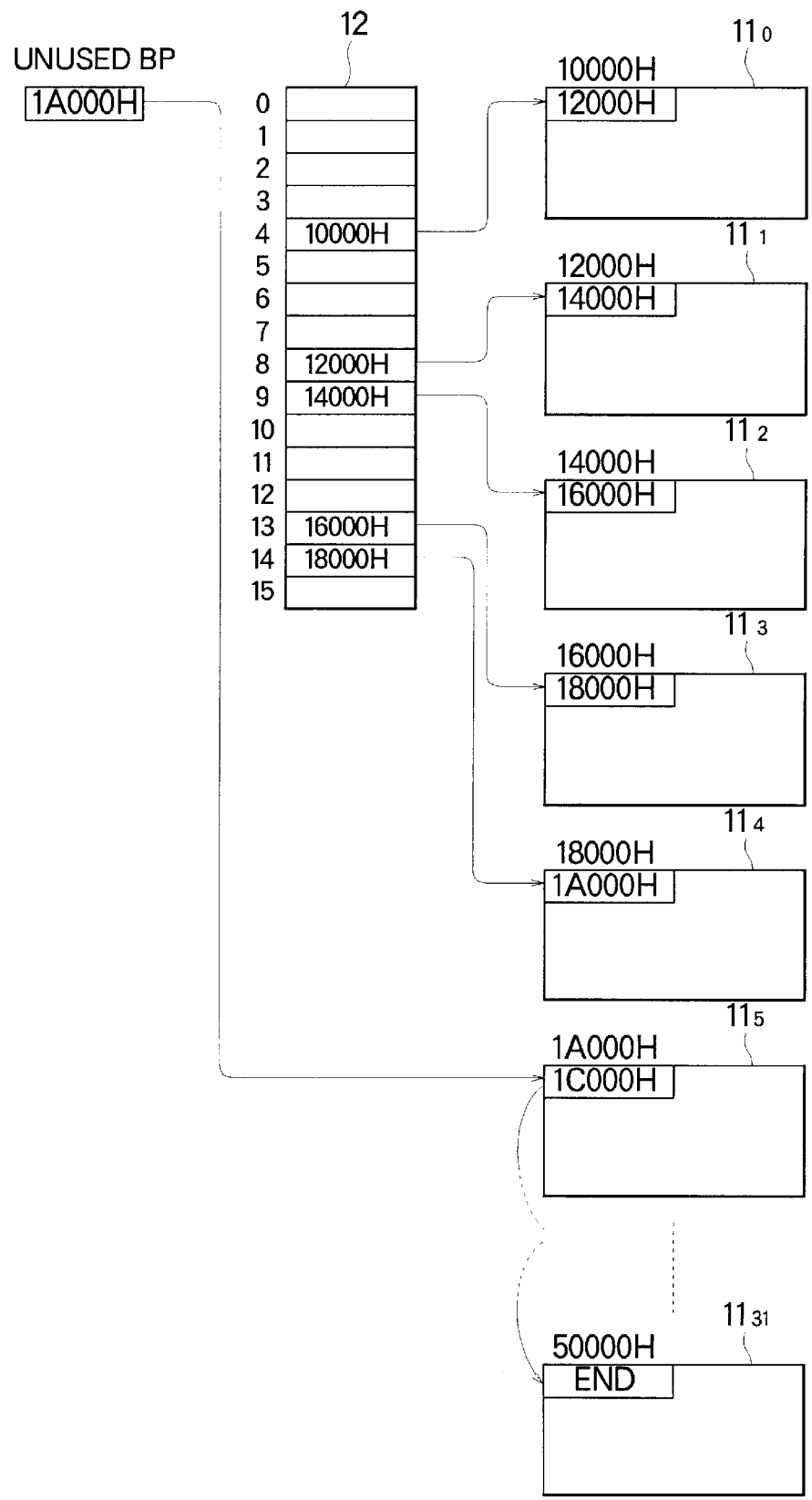
FIG. 9 is a schematic diagram showing a drawing state of the bit map memory according to the embodiment of the present invention.

FIG. 7 is a flow chart showing a drawing process according to the embodiment of the present invention. FIGS. 8 and 9 are schematic diagrams showing the bit map memory in the writing state.

First of all, the contents of the memory block pointer 12 are cleared (at step S10). Thereafter, image data contained in the j-th block in the format of intermediate code is extracted (at step S11). When the block does not contain image data to be drawn, the next block is processed (at step S12). On the other hand, when the block contains image data to be drawn (at step S12), the value of an unused block pointer as the address of a memory block that stores raster data of the block is stored to the j-th memory block pointer 12 (at step S13). The contents of the memory block to which the unused block pointer points are cleared (at step S14). The image data is bit-mapped to the memory block (at step S15). The value of the next block pointer is stored to an unused block pointer so that the memory block that contains the raster data is unlinked from the unused memory blocks (at step S16). In the example shown in FIG. 3, as shown in FIG. 8, when the image data of the fifth block is developed to the memory block $11_0$, only the memory block $11_0$ is unlinked from the unused memory blocks. A start address "12000H" of the next memory block is stored in a non-use block pointer. For j=1 to 16, the above-described process is repeated (looped). Thus, the process for one band is completed. As shown in FIG. 9, raster data is stored in five memory blocks $11_0$ to $11_4$. Thus, the number of unused memory blocks becomes 11.

Next, the printing process will be described.

Figure 10:
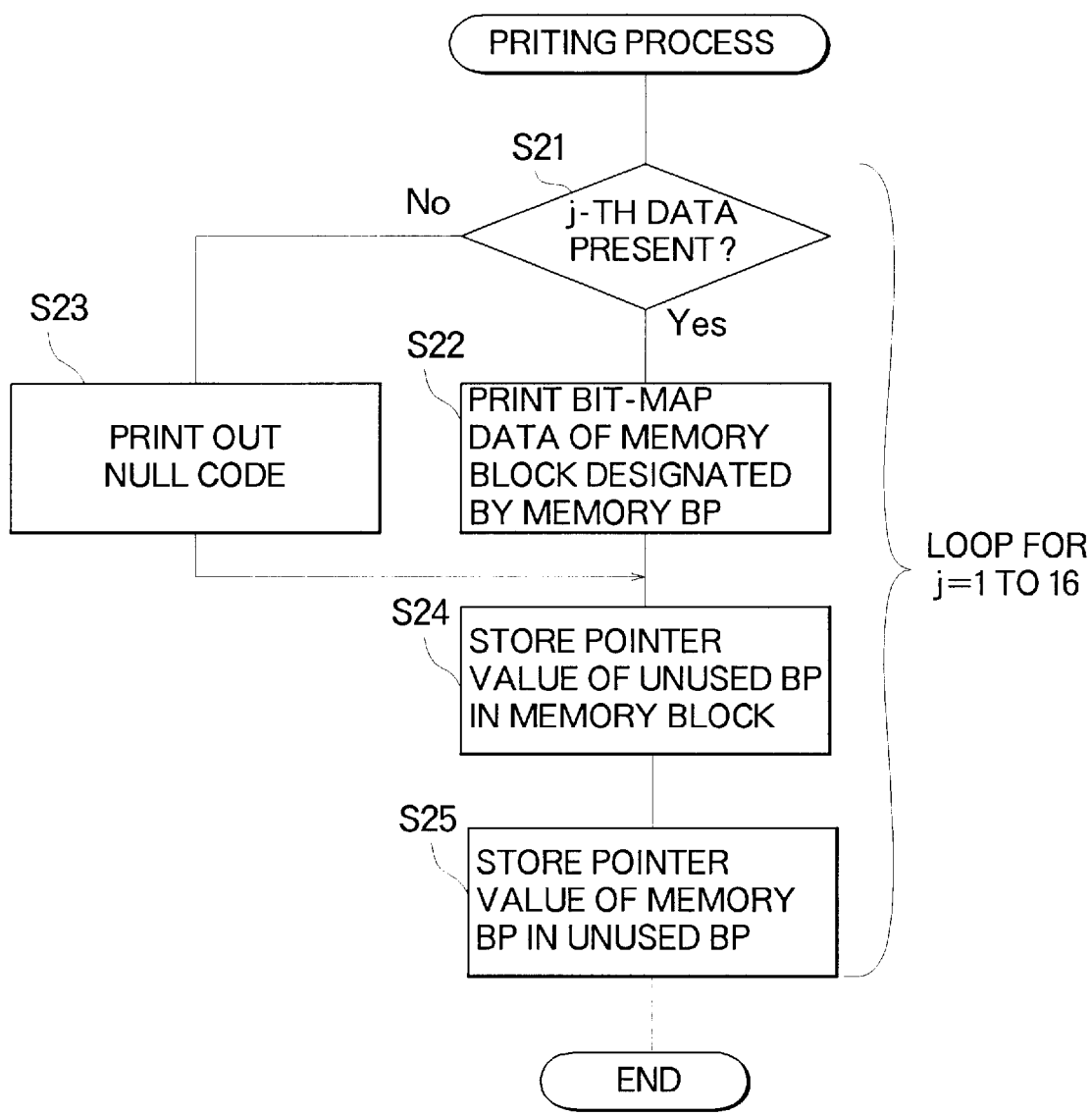
FIG. 10 is a flow chart showing a printing process according to the embodiment of the present invention.
Figure 11:
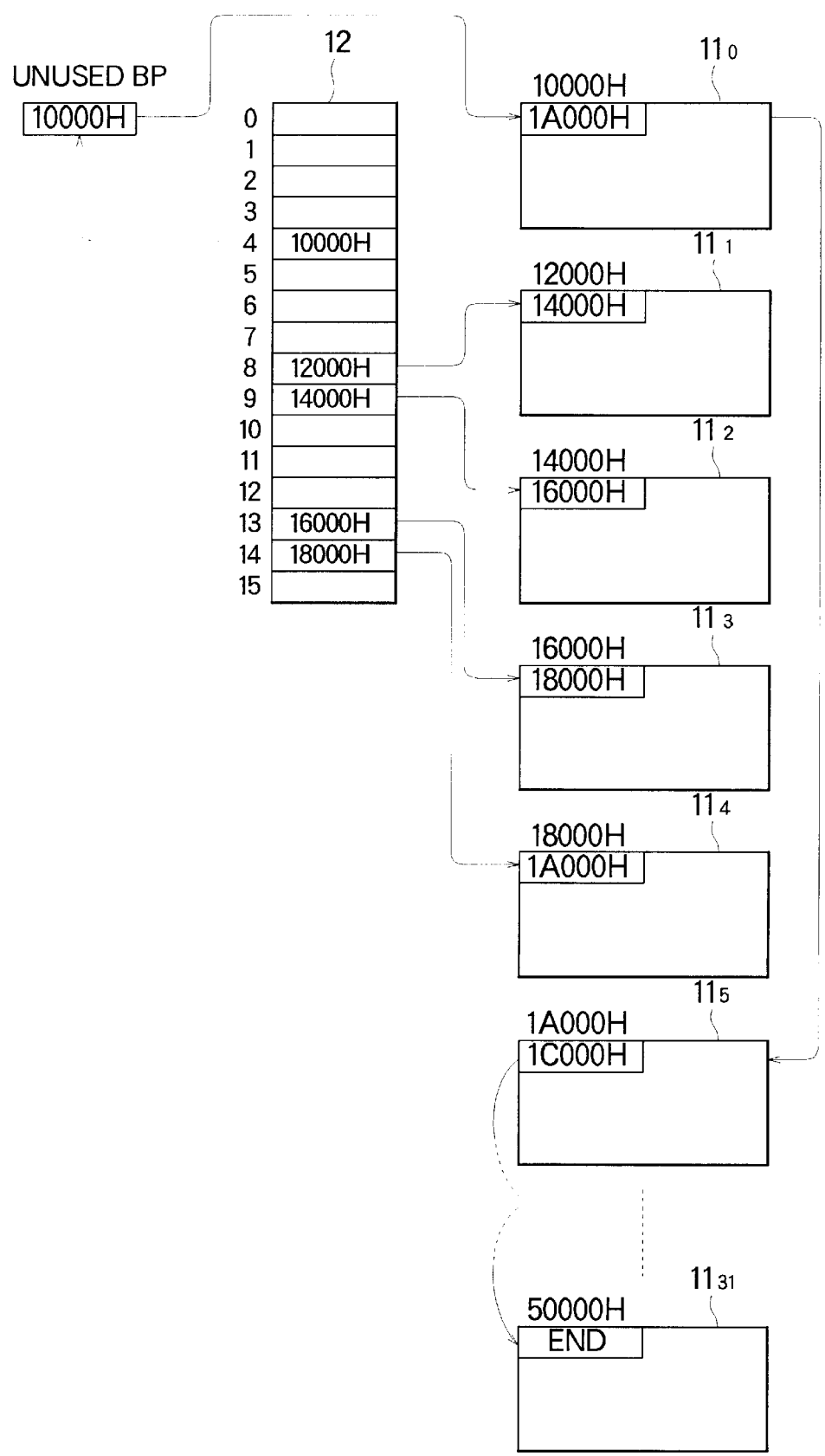
FIG. 11 is a schematic diagram showing a printing state of the bit map memory according to the embodiment of the present invention.
Figure 12:
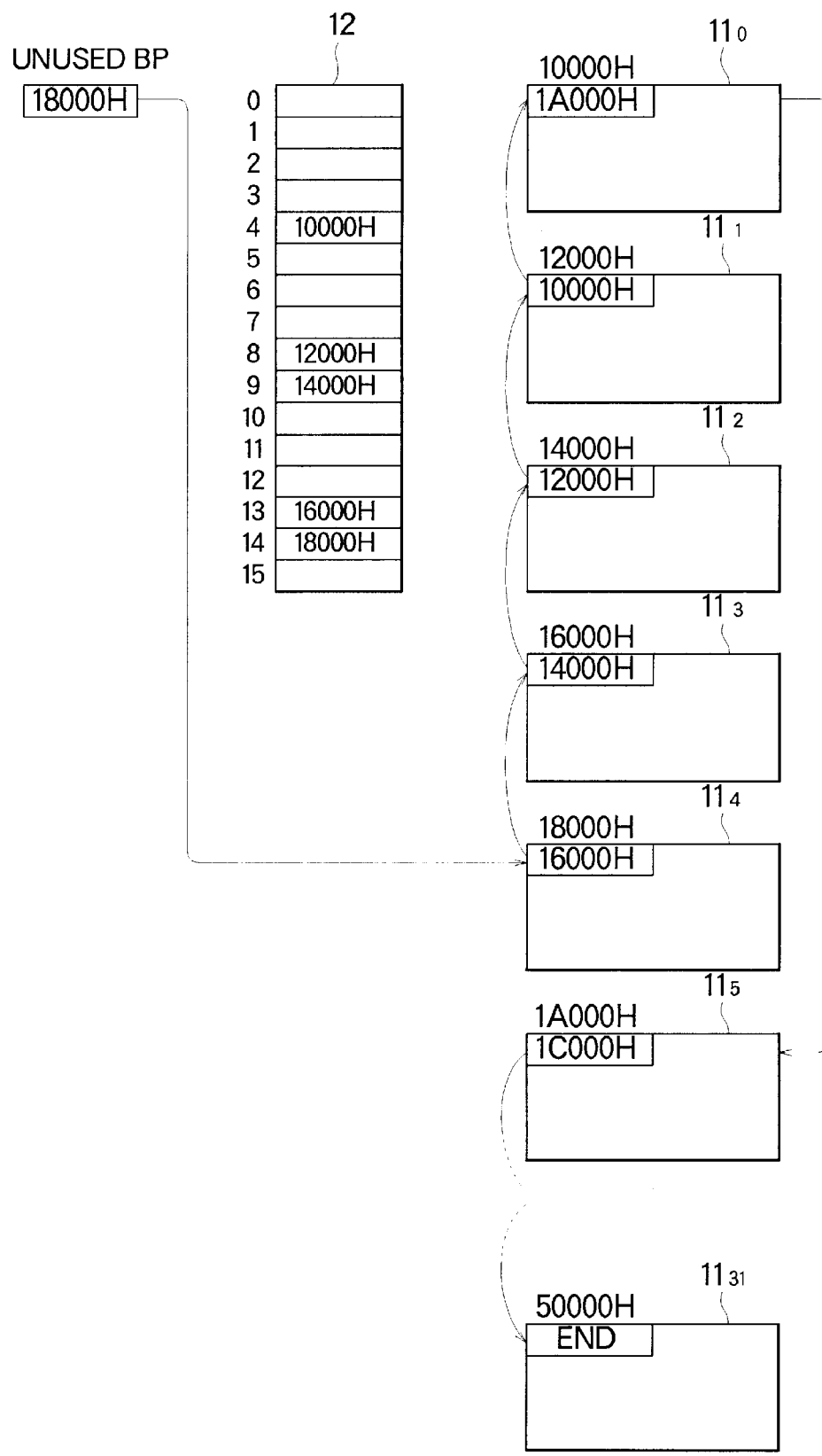
FIG. 12 is a schematic diagram showing the printing state of the bit map memory according to the embodiment of the present invention.

FIG. 10 is a flow chart showing the printing process according to the embodiment of the present invention. FIGS. 11 and 12 are schematic diagrams showing the bit map memory 8 in the printing state.

As shown in FIG. 10, a j-th memory block pointer 12 is referenced and it is determined whether or not the block data contains image data (at step S21). When the block data contains image data (at step S21), bit map data of a memory block to which the j-th memory block pointer 12 points is printed (at step S22). When the block data does not contain image data (at step S21), NULL code is output (at step S23). When the printing process for the memory block is skipped instead of outputting the NULL code, the printing speed can be increased.

Thereafter, as shown in FIG. 11, to add a memory block for which the printing process has been completed to unused memory blocks, the value of an unused block pointer is stored as the next block pointer of the memory block (at step S24). The j-th value of the memory block pointer 12 is stored in an unused block pointer (at step S25).

As shown in FIG. 12, for j=1 to 16, the above-described process is repeated. Thus, the printing process for one band is completed. Finally, five memory blocks $11_0$ to $11_4$ are linked to unused memory blocks.

According to the embodiment of the present invention, it is determined whether or not each block contains image data to be printed. Only when a block contains image data to be printed, the image data is developed as bit-map data to the bit map memory 8. Thus, the bit map memory 8 can be effectively used. In addition, the time necessary for developing raster data can be reduced. When image data is printed, only memory blocks to which memory block pointers point are read. Thus, the time for reading raster data can be reduced. In addition, before raster data is stored to the bit map memory 8, raster data stored in the bit map memory 8 is cleared for each block. As a result, since an extra erasing operation is not required, the time necessary for clearing the raster data is decreased.

In the above-described embodiment, the writing mode and the outputting mode were explained with the common block pointers 12. However, in reality, to perform the writing process for one band and the outputting process for the drawn band in parallel, at least one sets of memory block pointers are required. Nevertheless, in the case that the writing process and the outputting process are alternatively designated with the one set of memory block pointers, when the outputting process completes before the writing process, the successive outputting process should wait until the writing process completes. In the present invention, to perform both the processes in parallel without the waiting time, at least three memory block pointers are used.

Figure 13:
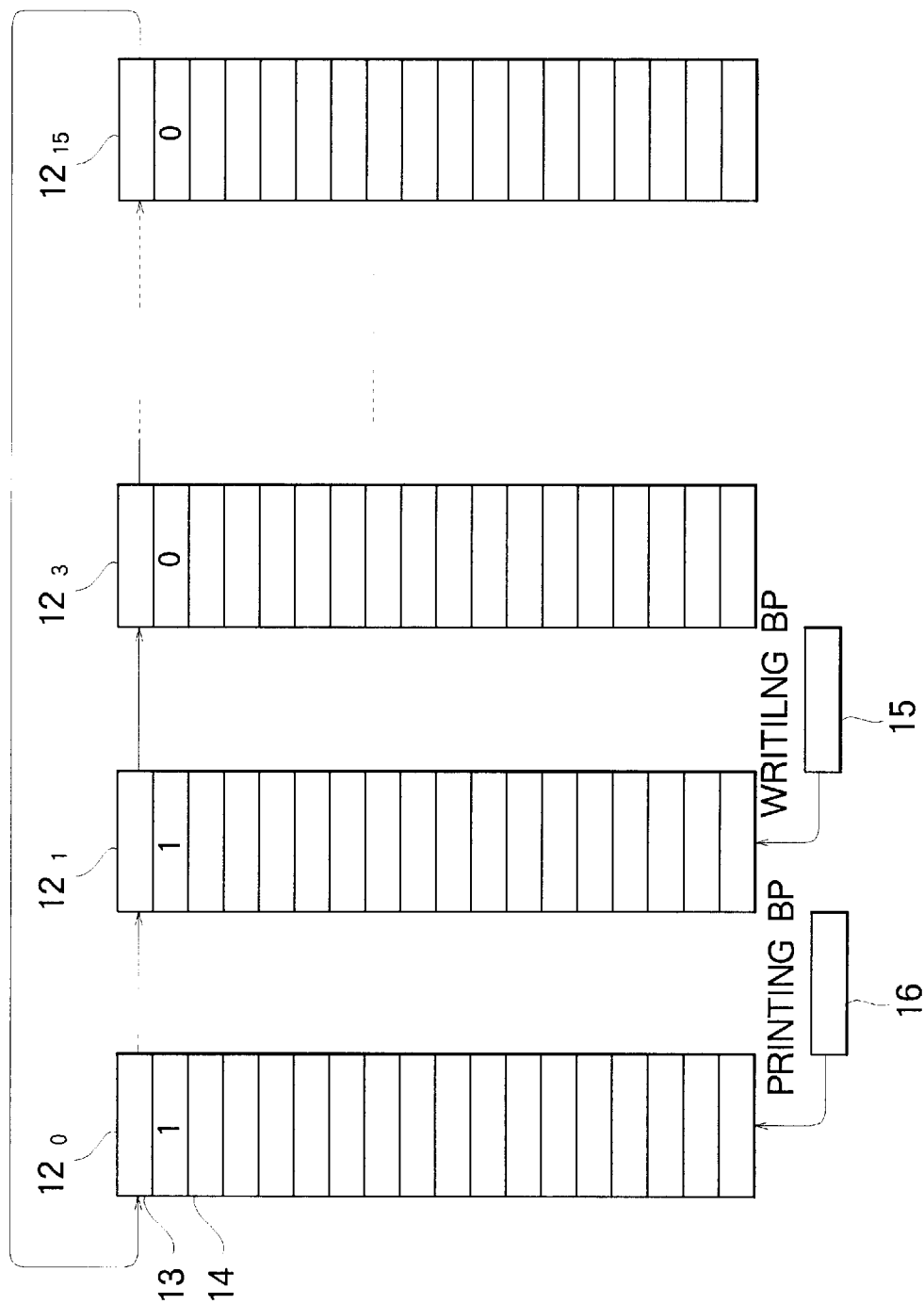
FIG. 13 is a schematic diagram showing a bit map memory using a plurality of memory block pointer.

FIG. 13 is a schematic diagram showing a structure according to a second embodiment of the present invention. In FIG. 13, 16 memory block pointers $12_0$ to $12_{15}$ for executing a printing process and a prior-analyzing (drawing) process that is performed before the printing process simultaneously in parallel are prepared for the respective memory blocks in one band. In the second embodiment, each of the memory block pointers $12_0$ to $12_{15}$ has a pointer 13 and a flag 14. The pointer 13 points to the next memory block pointer which is to be activated. The flag 14 represents whether or not the relevant block contains image data. The bit map memory 8 or the RAM 4 has a writing block pointer 15 and a printing block pointer 16 as identifiers. The writing block pointer 15 represents a memory block pointer corresponding to a band that is being written. The printing block pointer 16 represents a memory block pointer corresponding to a band that is being printed. Thus, the memory block pointers $12_0$ to $12_{15}$ are so linked as to be successively activated as the writing mode and outputting mode in the one direction.

Figure 14:
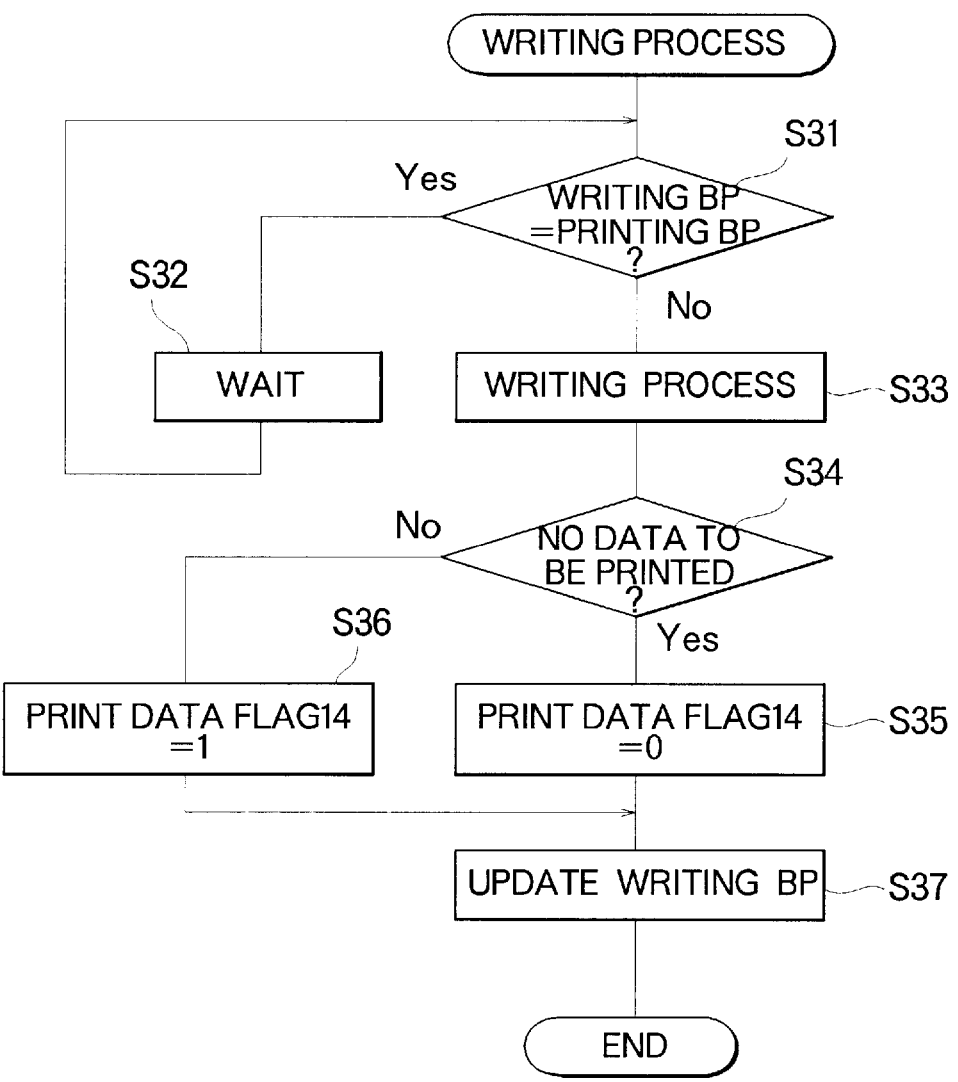
FIG. 14 is a flow chart showing the drawing process according to the embodiment of the present invention.

FIG. 14 is a flow chart showing the writing process according to the embodiment of the present invention.

First, it is determined whether or not the value of a writing block pointer 15 is equal to the value of a printing block pointer 16 (at step S31). When they are equal to each other (at step S31), to prevent the writing process from colliding with the printing process for the same block, the system causes the writing process to wait (at step S32). When they are not equal to each other (at step S31), the above-described writing process is executed (at step S33). It is determined whether or not the band contains image data to be printed as the result of the writing process (at step S34). When the band does not contain image data (at step S34), the image data flag 14 is set to "0" (at step S35). When the band contains image data (at step S34), the flag 14 is set to "1" (at step S36). Thereafter, the writing block pointer 14 is updated (at step S37).

Figure 15:
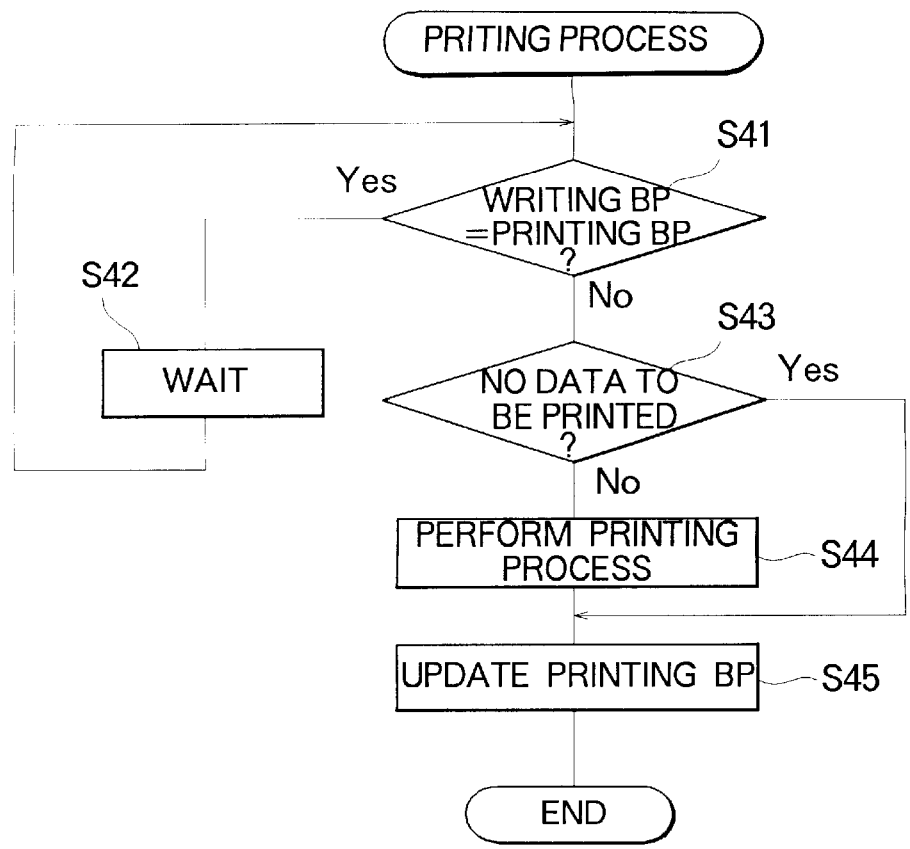
FIG. 15 is a flow chart showing the printing process according to the embodiment of the present invention.

FIG. 15 is a flow chart showing the printing process according to the embodiment of the present invention.

It is determined whether or not the value of a writing block pointer 15 is equal to the value of a printing block pointer 16 (at step S41). When they are equal to each other (at step S41), to prevent the printing process from colliding with the writing process, the system causes the printing process to wait (at step S42). When they are not equal to each other (at step S41), with reference to the image data flag 14, it is determined whether or not the band contains image data (at step S43). When the band contains image data (at step S43), the above-described printing process is executed (at step S43). In addition, the printing block pointer 16 is updated (at step S45). When the band does not contain image data (at step S43), the printing process for the band is skipped and the printing block pointer 16 is updated (at step S45).

In the above-described process, for each band, the drawing block pointer 15 is controlled so as to be prior to the printing block pointer 16.

According to the embodiment, each of the memory block pointer $12_0$ to $12_{15}$ has the image data flag. Corresponding to the flag, since bands that do not contain image data can be skipped, the printing speed of image data can be increased.

Figure 16:
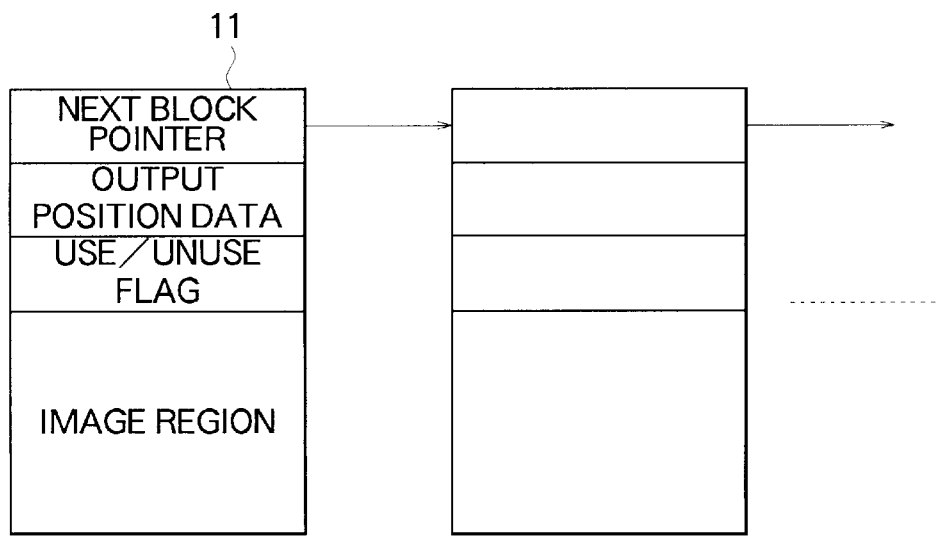
FIG. 16 is a schematic diagram showing a memory block according to another embodiment of the present invention.

In the above-described embodiment, the output position of raster data recorded in each memory block is designated with the memory block pointer. Instead, the position information of each block may be directly stored in a memory block. FIG. 16 is a schematic diagram showing an example of such a memory block 11. Each memory block 11 has output position information and use/unused flag along with a next block pointer. In other words, position information assigned to each block is stored to the memory block 11 as output position information. Before each block is printed, it is determined whether or not the block contains image data to be printed with reference to output position information of all memory blocks. When the block contains image data to be printed, raster data thereof is read. Additionally, corresponding to the use/unused flag, it can be determined whether image data can be drawn to a memory block or the printing process is in the wait state.

As described above, according to the present invention, each band is divided into a plurality of blocks. In addition, the bit-map memory is divided into a plurality of memory blocks corresponding to the respective image blocks. Image data of only blocks that contain image data to be printed is successively developed to unused memory blocks. Thus, blank blocks are not developed as bit-map data to the memory. Consequently, the memory blocks can be used in the developing process for the next process. Thus, blank portions can be removed from the bit-map memory. Consequently, the use efficiency of the memory is improved.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. An image output method, comprising:
   dividing image data of one page into a plurality of data blocks, an image output region of one page being divided into a plurality of bands perpendicular to a head scanning direction, each band being divided into a plurality of blocks along the head scanning direction, each block data corresponding to each block;
   preparing a bit map memory for writing and reading image data of data blocks that contain valid image data, the bit map memory being divided into a plurality of memory blocks, each of which has a storage capacity for storing image data of data blocks so as to write and read the image data for each data block;
   successively developing image data of the data blocks that contain valid image data to unused memory blocks, each memory block being linked with position information that designates a position to which the image data developed to the memory block is to be output; and
   successively reading and outputting image data from the memory blocks corresponding to the position information of the blocks.

2. An image output apparatus having a head for raster scanning, comprising:
   image data dividing means for dividing an image output region of one page into a plurality of blocks along a head scanning direction and dividing image data to be output into image data of each block;
   a bit map memory divided into a plurality of memory blocks, each of which has a storage capacity for storing image data of each block in a format of raster data;
   unused memory block identifying means for identifying unused memory blocks within the memory blocks;
   developing process means for successively developing image data of each of the blocks divided by said image data dividing means as raster data to the unused memory blocks corresponding to identification information of said unused memory block identifying means;
   memory block assigning means for storing addresses of memory blocks to which the image data has been developed and position information of blocks to which the image data is output; and
   output means for outputting image data developed to memory blocks with addresses corresponding to the positions of blocks assigned by said memory block assigning means.

3. The image output apparatus according to claim 2, wherein said image data dividing means divides the image output region of one page into a plurality of bands perpendicular to the head scanning direction and divides each band into the plurality of blocks, and wherein said memory block assigning means is prepared for each band and has identifiers for identifying a band that is being written and a band that is being printed.

4. An image output apparatus having a head for raster scanning, comprising:
   image data dividing means for dividing image data of one page into a plurality of data blocks, an image output region of one page being divided into a plurality of bands perpendicular to the head scanning direction, each band being divided into a plurality of blocks along the head scanning direction, each data block corresponding to each block;

a bit map memory for writing and reading image data of the data blocks, that contain valid image data, in the data blocks divided by the image data dividing means, the bit map memory being divided into a plurality of memory blocks, each of which has a storage capacity for storing image data of a data block so as to write and read the image data for each data block;

at least three memory block assigning means for assigning a writing process and a reading process for each memory block of the bit map memory, each of the memory block assigning means storing addresses of memory blocks of one band, the memory block assigning means being linked in such a manner that memory blocks can be successively activated as a writing mode and an outputting mode in one direction, only addresses of memory blocks in which valid image data is written being written so as to be linked with position information of blocks which is to be output;

developing process means for developing image data of data blocks that contain valid image data obtained by the image data dividing means into raster data, for each memory block successively assigned by the memory block assigning means designated to the writing mode; and output means for outputting raster data for each memory block successively assigned by the memory block assigning means designated to the outputting mode.

5. The image output apparatus according to claim 4, wherein said memory block assigning means are prepared as amounting to said memory blocks in one band.

6. The image output apparatus according to claim 4, wherein each of said memory block assigning means has a pointer for pointing to next memory block assigning means which is to be activated, and a flag for representing whether or not the image data is contained in a corresponding memory block.

* * * * *